2 Sheets—Sheet 1.

C F BOSWORTH.

Assignor, by mesne assignments, to THE STRAW SEWING MACHINE COMPANY.

Sewing-Machines.

Re

No. 7,985. Reissued Dec. 11, 1877.

Witnesses:
J. H. Shumway
H. A. Wilson

Chas F. Bosworth
Inventor
By Atty
Wm. E. Earle

N. PETERS, PHOTO-LITHOGRAPHER, WASHINGTON, D. C.

2 Sheets—Sheet 2.

C. F BOSWORTH.

Assignor, by mesne assignments, to THE STRAW SEWING MACHINE COMPANY.

Sewing-Machines.

No. 7,985. Reissued Dec. 11, 1877.

Witnesses.

J. H. Phinney

Chas. A. Atton.

Chas. F. Bosworth.

Inventor

By Atty.

Wm. C. Earl.

J. SEYERS, PHOTO-LITHOGRAPHER, WASHINGTON, D. C.

UNITED STATES PATENT OFFICE.

CHARLES F. BOSWORTH, OF MILFORD, CONN., ASSIGNOR, BY MESNE ASSIGNMENTS, TO THE STRAW SEWING MACHINE COMPANY, OF SAME PLACE.

IMPROVEMENT IN SEWING-MACHINES.

Specification forming part of Letters Patent No. 38,807, dated June 9, 1863; Reissue No. 6,467, dated June 1, 1875; Reissue No. 7,985, dated December 11, 1877; application filed December 4, 1877.

*To all whom it may concern:*

Be it known that I, C. F. BOSWORTH, of the town of Milford, in the State of Connecticut, have invented certain new and useful Improvements in Sewing-Machines, whereby such machines are better adapted to the sewing of braid or plaiting or other narrow strips of material, the improvements being chiefly applicable to stitching together braids of straw, hair, chip, palm-leaf, &c., in the manufacture of hats, caps, and bonnets.

These improvements are fully, clearly, and exactly hereinafter described, in connection with the drawings, which make part of the description.

Figure 1:
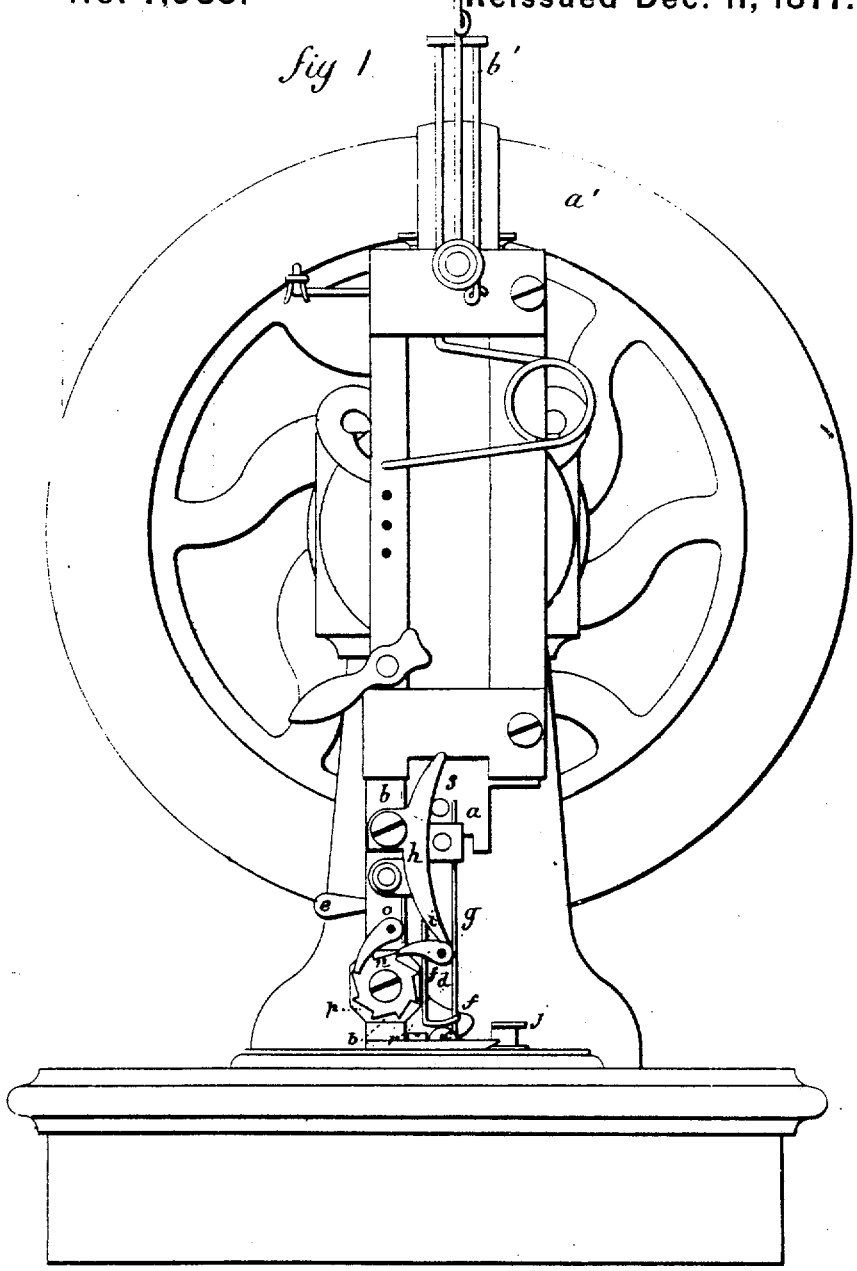
Figure 2:
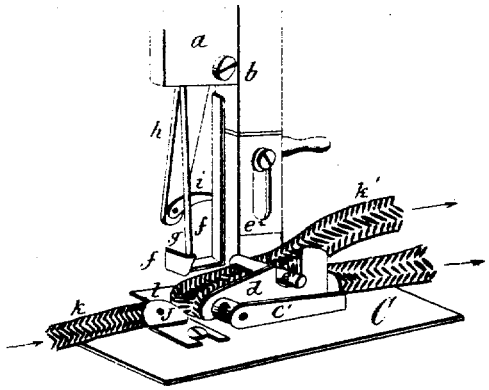
Figure 3:
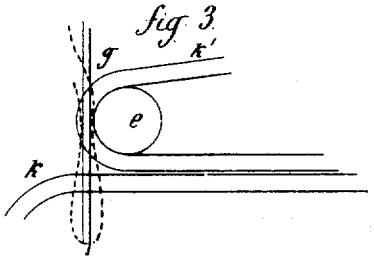
Figure 4:
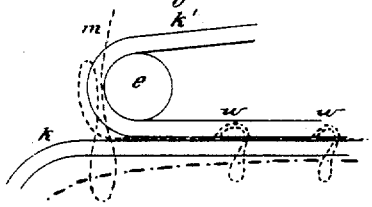

In the drawings, Figure 1 is a front elevation of a sewing-machine with my improvements attached. Fig. 2 is a view, in perspective, of certain parts of the sewing-machine. Figs. 3, 4, 5, and 6 are sketches exhibiting on a large scale the roller over which a piece of braid is to be fed, and illustrating some of the varieties of stitch that may be made by the use of my improvements.

Braids of straw, &c., are usually sewed together by hand. The stitch commonly employed is a long one, and of such a character that little or none of the thread appears upon what is usually termed the "right side."

My improvements are applicable, under certain changes of form, to most of the sewing-machines now in use and making different varieties of stitch, the precise method of confining the loops of upper thread passed through the goods by an eye-pointed piercing-needle being immaterial so far as the sewing of straw is concerned; but I have experimented chiefly upon shuttle-machines, and reduced my invention to practice on such a machine, and have in the drawings shown my improvements as applied to and acting in combination with a Singer shuttle-machine with a transverse shuttle.

These and other sewing-machines are so well known in the market and to manufacturers and workmen that any detailed description of the construction or operation thereof is deemed unnecessary.

My invention consists of certain combinations of mechanical devices which are set forth in the claims at the close of this specification.

In the drawings, the fly-wheel of the machine is shown at $a'$, the needle-bar at $a$, the needle at $g$, the take-up apparatus at $b'$, and the table or surface upon which the goods to be sewed are supported at C; and the machine has a feed apparatus of any known kind which is capable of advancing braid, &c., to be stitched between a presser-foot, such as $b$, and a table, and also a shuttle (carrying a bobbin of second or under thread) so moved and operated as to confine loops of needle-thread passed through braid by the piercing-needle.

The distinguishing peculiarity of the stitch made by the use of my improvements is this—namely, that the piercing-needle with the thread it carries enters a piece of braid from the side that is nearest to the other piece of braid to which it is to be sewed, and leaves that first piece of braid on the same side at which it entered. This is the leading idea on which my invention is based, and the improvements carry this idea into practice. There is, therefore, attached to the presser-foot bar, or to some other convenient part of the machine, a frame, $c'$, which carries a roller, $e$, whose axis is at right angles, or nearly so, with the line of progression of the work.

The upper of the two pieces of braid to be stitched together, $k'$, passes over this roller, then under it, and thence over the other piece of braid $k$, and the roller holds one piece upon the other. In order to keep the upper braid in position sidewise, there is an adjustable gage, $d$, which may be attached to the frame $c'$, and operates upon one edge of the braid, and I have represented another gage, $l$, which operates at the opposite edge of the braid; and in order to make the upper braid apply itself closely to the roller, there is supported in the frame or attached to the presser-foot another bar or roller, $e^1$, which rests upon the surface of the braid. I prefer to attach this bar to a slide, $e^2$, clasping the presser-foot rod, and adjustable thereon by a set-screw, so that the bar or roller may be set to adapt itself to different thicknesses of braid. In order to guide the under piece of braid there may be attached to the table a guide, $j$.

In sewing with the contrivance, as thus far described, a single piece of braid, or the braid on the edge of a number of pieces already stitched together, is to be introduced under the presser-foot, (see Fig. 2,) and another piece of braid is to be passed under the bar $e^1$, and thence over and under roller *e*. If *e* be properly set with reference to the needle, the latter will pass into the upper braid, out of it again, on the same side that it entered, and thence through the lower one, (see Fig. 3,) and its thread may appear on the upper surface, as in Fig. 6 at *w*; or, if the braid be thick, or the roller farther from the needle, the thread may not appear at all on the upper surface, but assume a position, as shown at *w*, Fig. 4. When the loop of needle-thread has been secured below the lower braid, and the needle has risen out of both pieces, then the feed will advance both braids, and in so doing will carry the upper one over the bending-roller, so that it may be pierced at a different spot on the next descent of the needle, the feed and roller, by their combined action, presenting the upper braid properly.

This operation would not, however, be as certain as desirable, owing to the springing of the needle by the glancing of its point from the bent surface of the braid. I therefore apply to the presser-foot, or other convenient support, a guide such as *f*. A bent piece of metal with a conical hole in it, or a simple surface standing nearly upright, but inclining away from the needle at its upper edge, answers the purpose of such guide. The guide *f* (shown in the drawings) has two surfaces, meeting at an angle or apex through which the needle passes. By means of this addition the needle is forced to pierce in the desired line, and the operation of sewing is rendered certain. The loops of needle-thread passed through the lower braid are to be confined by a shuttle-thread, as shown in the drawings, or by a looped thread, as in the Grover & Baker stitch-machines, or by a loop of the upper thread, as in crochet-machines, and the stitch is drawn tight when it has passed, or just as it is passing away from the roller.

As the seam is stronger when the needle-thread shows on the upper surface, and as it is desirable that it should show only at long intervals farther apart than can be conveniently fed or sewed in a sewing-machine in the interval between one stitch and another, I have devised a contrivance by the use of which some of the stitches will be made in the lower braid only. In order to do this the needle is set so that it will not pierce the upper piece of braid at all, unless the needle is bent or sprung over toward the roller on its descent, and the needle-guide *f* is mounted upon a spring-arm, which tends to press it toward the roller *e*, while an adjustable stop regulates the distance to which the needle-guide shall approach the roller. Upon the presser-foot bar there is mounted, so that it can turn, an irregular polygonal plate, *p*, having secured to it a ratchet-wheel, *n*, provided with a detaining-pawl, if necessary, as at *o*, and with an actuating-pawl, such as *i*, pivoted to a crooked bar, *h*, which is pivoted on the presser-foot. A pin, *s*, is attached to the needle-bar, and the crooked bar and pin are so arranged, relatively to each other, that each stroke of the bar shall reciprocate the pawl, and, consequently, turn the irregular plate, which bears against the spring-support of the needle-guide.

Figure 5:
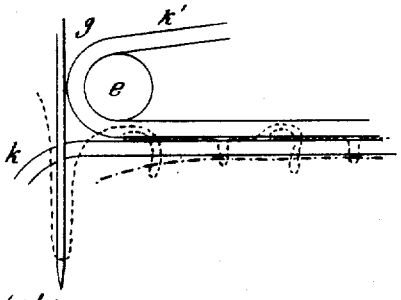
Figure 6:
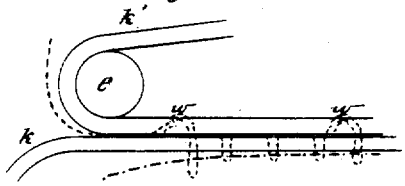

By shaping this plate properly the needle can be caused to pierce the upper piece of braid at every other stitch, or every second, third, or fourth, or greater number of stitches, as desired, so that seams may be sewed like those in Figs. 5 and 6; or by proper shape and adjustment of the parts, seams may be sewed where the upper thread shows at intervals on the upper surface of the upper braid, and at other times merely catches into the upper braid; or seams may be sewed having some stitches showing in the upper surface of the upper braid, others catching into it and not showing, and others still which do not touch the upper braid at all.

In sewing such seams the needle springs away from the roller and is drawn toward it at the time, and to the extent desired, by the spring-guide, the latter being governed by the irregular-shaped plate.

This whole contrivance, therefore, is one for vibrating the needle to and fro in the direction of the line of the seam, and any contrivance that will so cause the needle to vibrate as to pierce or not pierce the upper braid, as desired, may be substituted for the apparatus especially described.

Where a vibrating needle, as thus described, is used, the feed apparatus feeds both the upper braid and the material to which it is to be stitched, as before stated, and presents both braids in such manner, by the aid of the roller, that the needle may puncture either both braids or one braid only, depending upon the line in which the needle descends.

The roller *e* may revolve or be stationary. I prefer that it should revolve.

As before stated, any proper feeding apparatus may be used, but I prefer that commonly known as the four-motion roughened-surface feed, or else the wheel-feed. As the braids to be sewed together are sometimes of considerable thickness, and as one lies on top of the other, the uppermost braid will be held slightly above the table or platform of the machine. An ordinary feeding-bar will therefore act most effectually, if not entirely, on the lowermost braid; but as the sewing, owing to the great length of the stitches, will be better if the feeding device acts equally on both braids, I intend sometimes to use independent feeds, one adjusted for each braid, and when using a four-motion feed, to split the feeding-bar at or about the line of junction of the braids, thus making two feeding-bars, and to apply a set-screw or some equivalent device, so that the two bars may have their relative heights Re 7985 tance than the other, and in order to make the feed adapt itself to both, so as not to wrinkle either, and in order also to regulate the curvature of the seam, I intend to make one feed move at each stitch through a greater distance than the other does. This object may be attained most easily by advancing two feeding-bars by the same cam, and by regulating their retreating motions by separate stops, one or both of which may be adjustable, and acting like the adjustable feed-regulators well known to constructors of sewing-machines.

I do not claim a vibrating needle simply, nor a guide for a needle, nor rollers, or bars, or guides for cloth or braid, by themselves, or out of the combinations in which I employ them so as to produce the desired effect; but I do claim as of my own invention—

1. The combination, substantially as before set forth, of an eye-pointed needle, a roller or its equivalent, over which the braid to be a guide for the lower braid.

3. The combination, substantially as before set forth, of an eye-pointed needle, a roller or its equivalent, around which braid can be bent, and a needle-guide, the three being arranged and acting in combination substantially as specified.

4. The combination, substantially as before set forth, of a vibrating eye-pointed needle, substantially as specified, with a roller around which braid can be bent or turned, and feed apparatus, the mode of operation of the combination being substantially such as set forth.

In testimony whereof I have hereunto subscribed my name on this 3d day of December, A. D. 1877.

CHARLES F. BOSWORTH.

Witnesses:
JOHN E. EARLE,
H. A. KILSON.

BEST AVAILABLE COPY